United States Patent [19]

Swindle

[11] Patent Number: 4,467,178

[45] Date of Patent: Aug. 21, 1984

[54] CONTROL SYSTEM FOR REGULATING WATER HEATER OPERATION IN ACCORDANCE WITH ANTICIPATED DEMAND

[76] Inventor: Elro M. Swindle, P.O. Box 628, Millbrook, Ala. 36054

[21] Appl. No.: 362,289

[22] Filed: Mar. 26, 1982

[51] Int. Cl.³ .................. H05B 1/02; G05D 23/19; F24H 1/00

[52] U.S. Cl. .................. 219/330; 126/351; 219/506; 219/508; 236/47; 236/51; 237/8 R

[58] Field of Search .................. 219/327–331, 219/334, 508, 320, 321, 506, 364; 236/47, 51; 126/351; 237/8 R

[56] References Cited

U.S. PATENT DOCUMENTS

| 1,968,549 | 7/1934 | Allen | 219/330 |
| 2,266,147 | 12/1941 | Biebel | 219/334 |
| 2,379,398 | 6/1945 | Clark | 219/328 |
| 2,480,302 | 8/1949 | Pankow | 219/330 |
| 2,761,950 | 9/1956 | Tagliaferri et al. | 219/364 |
| 4,267,432 | 5/1981 | Kiepe | 219/330 |
| 4,317,987 | 3/1982 | Fieldman | 219/327 |
| 4,361,274 | 11/1982 | Raleigh et al. | 219/505 X |

FOREIGN PATENT DOCUMENTS

| 659084 | 10/1951 | United Kingdom | 219/330 |
| 946992 | 1/1964 | United Kingdom | 219/328 |
| 977741 | 12/1964 | United Kingdom | 219/328 |
| 1041558 | 9/1966 | United Kingdom | 219/328 |
| 1276332 | 6/1972 | United Kingdom | 219/328 |
| 1426399 | 2/1976 | United Kingdom | 219/328 |
| 1589264 | 5/1981 | United Kingdom | 219/328 |
| 2069778 | 8/1981 | United Kingdom | 219/328 |

OTHER PUBLICATIONS

"One-Shot Control of Immersion Heaters", Wireless World, Apr., 1981, vol. 87, No. 1543, p. 49.

"One-Shot for an Immersion Heater", Elektor, Jul.-/Aug., 1977, vol. 3, No. 7-8, p. 37.

Primary Examiner—A. Bartis
Attorney, Agent, or Firm—LeBlanc, Nolan, Shur & Nies

[57] ABSTRACT

A control system for selectively regulating the operation of water heating tank in accordance with anticipated hot water demand thus eliminating storage heat losses during periods when hot water is not required includes a remote control unit, a relay unit and first and second thermostats, all electrically connected selected circuits with an electric heating element located within the tank. The first and second thermostats are arranged to sense the temperature of the tank water and the operating temperature (115° F.) of the first thermostat is lower than that of the second thermostat (150° F.). The remote control unit includes a three-position switch in circuit with the relay unit and first and second thermostats to permit continuous energization of the heating element under control of either the first thermostat in the first switch position or the second thermostat in the second position to provide a continuous supply of hot water at either 115° F. or 150° F. The third switch position permits selective "one-time" operation of the heating element through a first or a second relay unit holding circuit established by a first or a second momentary contact switch, respectively, on the remote control unit broken by the first or the second thermostat, respectively, upon attainment of a predetermined temperature level (115° F. or 150° F.) within the tank. The remote control unit is provided with indicator lights associated with the selected circuits for providing indication of the tank water temperature and condition of energization of the heat element. The remote control unit may include a cancel switch for deenergizing the heat element when the three-position switch is in the third position.

7 Claims, 3 Drawing Figures

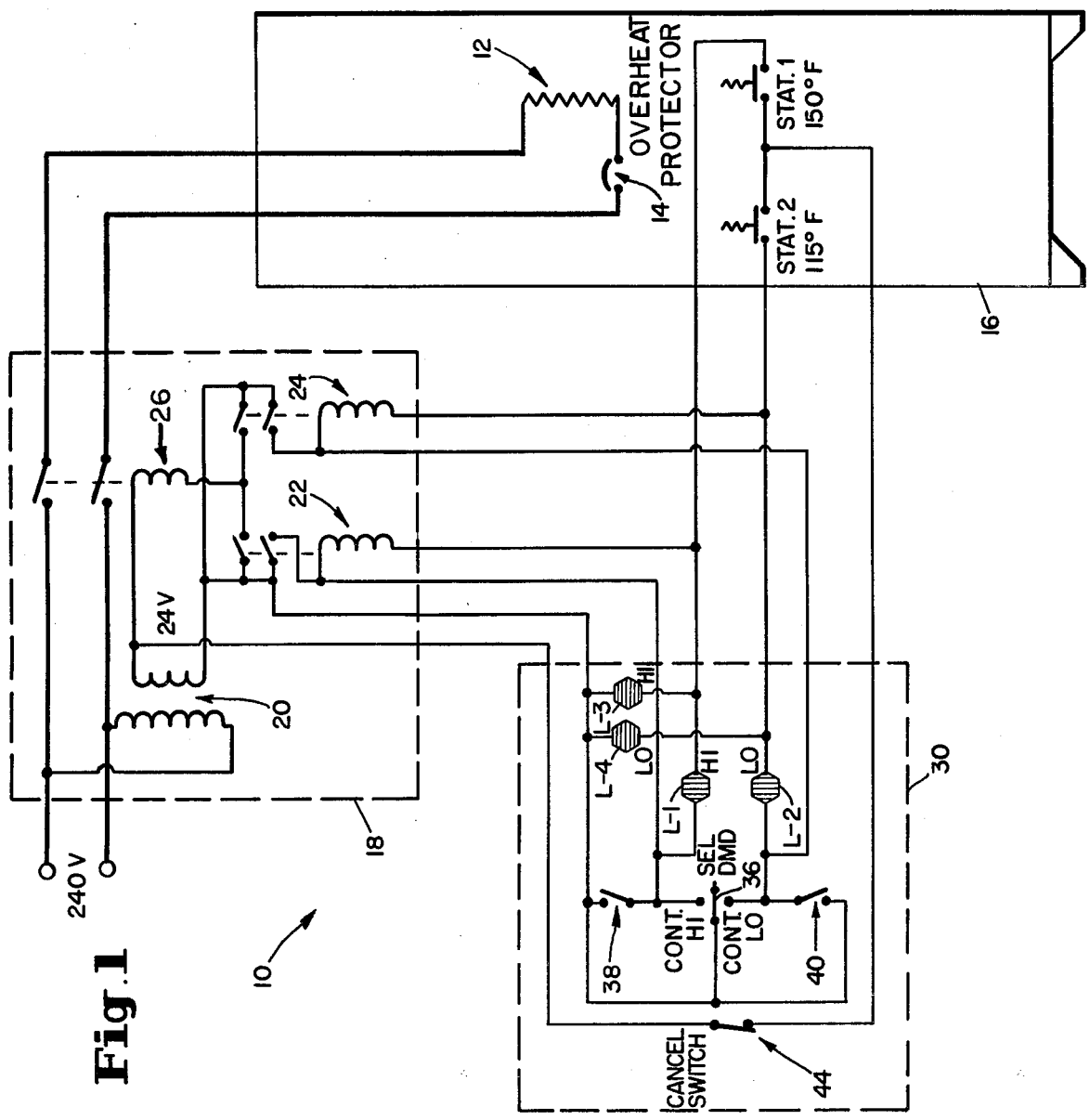
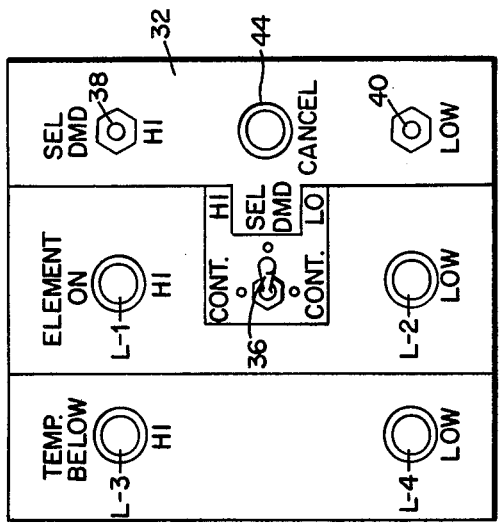
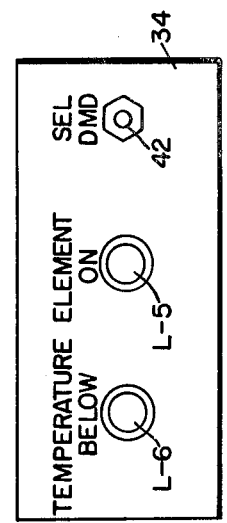

4,467,178

CONTROL SYSTEM FOR REGULATING WATER HEATER OPERATION IN ACCORDANCE WITH ANTICIPATED DEMAND

BACKGROUND AND SUMMARY OF THE INVENTION

The present invention relates to a water heater control system. More particularly, the present invention relates to a control system for a hot water heater, in which the water within the heater is heated only upon demand.

Conventional hot water heating systems maintain a predetermined temperature of the water in storage. The heat energy which is lost through the insulation of a typical water heater storage tank on a daily basis can amount to as much as 3400 BTU of energy per 10 gallons of storage water at a temperature of 140° F. This means that a 60 gallon water tank will use over 20,000 BTU's per day to maintain the contents at a temperature of 140° F., due to energy losses through the insulation of the tank.

Previous hot water heater control systems are described, for example, in the following U.S. Pat. Nos.: 2,480,302 to Pankow; 2,852,018 to Williams; 3,484,580 to Morgan; 4,058,702 to Jerles; and 4,166,944 to Scott. Such previous systems are primarily concerned with maintaining water in the system at a specific temperature or temperature range over an extended period of time, even though there may be no demand for hot water during a relatively long time period.

By the present invention, there is provided a water heater control system which eliminates essentially all of the storage heat losses during the periods when hot water is not needed. Such an energy saving is achieved by heating only that water which is to be utilized in the immediate future, and by not allowing the heating to continue after such hot water is consumed. Thus the water in the water heater storage unit is maintained in a substantially cold condition except on the occasions when hot water is actually needed. The water heater control system of the present invention can provide substantial savings when employed with the hot water heater utilized by a typical family in the home.

The present invention is particularly useful in solar hot water heating applications. A consumer who owns a solar hot water heating system is operating the system at reduced efficiency when the water must be maintained at a constant temperature by the use of supplemental electric or gas heat. Many consumers, faced with such reduced efficiency, have inactivated their hot water circuit breaker. In inclement weather, however, when the solar contribution is not sufficient, the consumer must turn the circuit breaker on, then guess how long he must wait before the water is hot enough. Such a practice is not only inconvenient but also increases the loss of heat, particularly if the time from heat up to use of the water is excessive. Also, the circuit breaker must be turned off again when hot water is no longer required.

The present invention also provides for significant savings in nonsolar applications. As an example, hot water heaters are typically set at a temperature in the range of 150°-180° F. for dishwasher requirements. Such a practice causes unnecessary heat losses when only warm water is required, such as for a bath or for doing the laundry, since the temperature differential between the hot water and the ambient temperature is unnecessarily high.

The water heater control system of the present invention includes: a relay box and a pair of thermostatically controlled switches which are usually mounted on the water heater; and a remote control unit which can be located in the kitchen or other convenient location in the home. The remote control unit provides both an indication of the present condition of the water temperature in the water heater, and also means for initiating the heating cycle in order to heat the temperature in the heater to either of two selected temperatures. Operation of the remote control unit when hot water is desired will energize certain relays in the relay box, thus providing heat to the water heater upon selective demand to heat the water to either of the two preselected temperatures. The present invention provides for heating the water to a selected temperature, at which time the heating unit is de-energized so that heating of water in the heater will not occur again until the water temperature drops below a selected temperature and the operator initiates operation of the system for the heating cycle to be repeated.

BRIEF DESCRIPTION OF THE DRAWINGS

FIG. 1 is a schematic representation of the water heater control system of the present invention;

FIG. 2 is a schematic representation of a control panel for the remote control unit of the water heater control system of FIG. 1; and FIG. 3 is a schematic representation of the control panel for a secondary remote control unit employed in the water heater control system of FIG. 1.

DESCRIPTION OF THE PREFERRED EMBODIMENTS

In the embodiment of the present invention as shown in FIGS. 1-3, there is provided a water heater control system 10, including a pair of thermostatically operated switches STAT-1 and STAT-2 which are located on the exterior of a water heater 16 and mounted in a conventional manner so as to provide an indication of the temperature of the water contained within the heater 16. STAT-1 and STAT-2 are thermostatically controlled switches of the general type which may be adjusted usually within a temperature range of from about 100° F. to about 170° F. STAT-1 should be set so as to close the circuit which it controls when the water temperature is colder than the temperature setting for hot water, generally about 150° F. It is open otherwise. STAT-2 should be set so as to close the circuit which it controls when the water temperature is colder than the temperature setting for warm water, generally about 115° F. It is open otherwise.

A relay box 18 is also generally mounted on the exterior of the water heater 16 and includes a transformer 20, usually of the 240V/24V type. The relay box 18 also houses relays 22, 24 and 26. Relay 22 may be energized through a selective demand "high" switch 38 on the remote control unit 30, to be described hereinafter. Once energized, relay 22 remains self-energized through its lower contacts until STAT-1 opens. Relay 24 may be energized through a selective demand "low" switch 40 on the remote control unit 30. Once energized, this relay 24 remains self-energized through its lower contacts until STAT-2 opens. Relay 26 operates to activate the heating element 12 within the water heater 16 to heat the water therein. Overheat protection device 14 is also shown in the circuit, although it does not form a part of the invention. Relay 26 is energized through relay 22 or 24. For a gas-fired water heater, relay 26 may be replaced by an electrically operated gas valve.

The remote control unit 30 may be mounted in any convenient location, such as the kitchen, bathroom or laundry room. The panel 32 for the remote control unit 30 is shown in FIG. 2. Additional remote control units 30 may be installed at different locations where hot water control is desired. If only high or low selective demand control is required at a particular location, a more simplified control unit may be employed, with the panel 34 for such a simplified remote control unit being shown in FIG. 3. Such a panel 34 would be connected to either the high or low temperature selective demand circuit, depending upon the panel location. For example, if located near the dishwasher, the panel 34 would be connected to the selective demand high circuit since the selective demand low circuit would not be suitable for the high water temperatures required. If located in the bathroom, on the other hand, the panel 34 would be connected to the selective demand low circuit since higher temperature water would not be required.

As shown in the circuitry of remote control unit 30 and also on panel 32, the remote control unit 30 is provided with a three position switch 36, with the three positions being indicated as "selective demand", "continuous high", and "continuous low". As shown on the right side of panel 32, placing the three position switch 36 in the selective demand position allows further selection by activating a selective demand "high" switch 38 or a selective demand "low" switch 40. Switches 38 and 40 may be momentary push button actuated switches, of conventional type, which normally maintain their respective circuits in an open condition. Also provided on the right side of panel 32 is a "cancel" switch 44, which may also be of the momentary push button actuatable type, and which is normally maintained in the closed position. The purpose of switch 44 is to provide a means for cancelling selective demand "high" or "low" operation.

On the left side of panel 32 are located temperature lights L-3 and L-4, with L-3 being illuminated when STAT-1 is closed and with L-4 being illuminated when STAT-2 is closed. In the center portion of panel 32, lights L-1 and L-2 will illuminate to indicate that the heating element 12 is energized. Regardless of the position of switch 36, L-1 and L-2 will go out if the water heat level is satisfied, i.e., respective switches STAT-1 and STAT-2 are open. Thus the purpose of L-1 and L-2 is to indicate to the operator when the heating element 12 is energized.

On the more simplified remote control unit with panel 34, as shown in FIG. 3, there is provided a two position selective demand switch 42 which allows the selective demand feature to be either activated or inactivated. Panel 34 includes suitable lights L-5 and L-6, with light L-5, when illuminated, indicating that the selective demand mode, either high or low depending upon the installation, has been initiated, and with temperature light L-6, when illuminated, indicating that either STAT-1 or STAT-2 is closed.

Examples of the manner in which the present system may be operated are as follows:

CONDITION 1

The temperature of the water in the electric water heater 16 is above 150° F.; thus, both STAT-1 and STAT-2 are open. No relays can be energized and all pilot lights are out.

CONDITION 2

The water temperature is between 115° and 150° F. STAT-2 is open. STAT-1 is closed alerting relay 22. Light L-3 is on indicating the water is below the temperature setting of STAT-1, i.e., below 150° F. Relay 22 can now be energized by momentarily pressing switch 38 or by closing the 3-position switch 36.

CONDITION 2a

Water temperature between 115° and 150° F., STAT-2 open, STAT-1 closed. Relay 22 is alerted and light L-3 is on. Upon pressing switch 38, relay 22 is energized which causes relay 26 to become energized to heat the water with the electric element 12. Through its lower contacts, relay 22 remains energized. The relays become de-energized under either of two conditions: (1) when the temperature of the water reaches 150° F. and STAT-1 opens; or (2) if switch 44 is depressed. If the relay 22 is energized by the 3-position switch 36 and the switch 36 is left in the closed position, the only way relay 22 can be de-energized is for the water to reach 150° F. temperature so that STAT-1 is open. When relay 22 is energized, lights L-1 and L-3 will remain on. When STAT-1 opens, lights L-1 and L-3 will no longer be illuminated, thus returning to Condition 1.

CONDITION 3

Water temperature in the water heater is below 115° F., both STAT-1 and STAT-2 are closed alerting relays 22 and 24. Lights L-3 and L-4 are on indicating the water temperature is below the setting of both thermostats (below 115° F.). Either relay 22 or 24 can now be energized by pressing the respective switch 38 or 40 or the 3-position switch 36.

CONDITION 3a

Water temperature is below 115° F.; STAT-1 and STAT-2 are closed; Lights L-3 and L-4 are on; and relays 22 and 24 are alerted. If it is desired to heat the water to 150° F.: Depress switch 38. Light L-1 will come on, relay 22 will energize and self-hold; relay 26 will energize (anytime either relay 22 or 24 is energized). When the water temperature reaches 115° F., light L-4 will go out and relay 24 cannot be energized because STAT-2 opens at 115° F. When the water temperature reaches 150° F., STAT-1 will open, lights L-1 and L-3 will go out, relay 22 will de-energize and the heating element 12 will be de-energized by the opening of relay 26, thus returning to Condition 1.

Activation of selective demand "high" switch 38 will allow the present system 10 to heat water in the water heater 16 to the high temperatures, such as about 150° F., required for household uses such as dishwashing. During and after such heated water is used, the heating element 12 will not be actuated again, unless switch 38 or other switches on panel 32 or 34 are actuated. Use of switch 38 thus allows for "one time" heating of the water to high temperature and lowers heat losses between periods of hot water usage.

Activation of selective demand "low" switch 40 provides the most economical mode of operation for the present system 10. When switch 40 is actuated, the system 10 will heat water in heater 16 only to the necessary warm temperature, such as about 115° F., which is adequate for uses such as laundry loads and baths. As the warm water is used, heating element 12 will not be actuated again unless switch 40 or other switches on panel 32 or 34 are actuated.

When switch 36 is positioned for "continuous high" operation, the system 10 is returned to a standard conventional operation which maintains high temperature water continuously. Because such a mode of operation allows a significantly higher rate of heat loss between periods of use, this "continuous high" mode should only be employed when demand for hot water is unusually high. The best energy conservation practice would require switching back to selective demand operation as soon as continuously replenished hot water is no longer required.

The "continuous low" position of switch 36 is best suited for temporary use only when an unusually high demand for warm water is required, such as when warm water is needed for several hours for multiple baths, laundry or the like. Again, conservation of energy would require switching back to selective demand operation when continuous warm water is no longer required. The "continuous low" mode may be used alternately with the "continuous high" mode to increase or reduce the amount of available hot water. Thus, for example, if the "last person in the bath" did not have enough hot water during operation in the "continuous low" mode, the user might wish to employ the "continuous high" mode if such circumstances of usage should arise in the future.

While a hot water temperature of 150° F. and a warm water temperature of about 115° F. have been utilized in the description of operation as stated above, it should be understood that other temperatures may be employed, depending upon the particular desired conditions.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by Letters Patent is:

1. A control system for selectively regulating the operation of a fluid heating tank having heating means to heat the fluid in accordance with anticipated demand for the heated fluid, comprising:

first temperature sensing means for sensing the temperature of the fluid within a tank and providing a signal when said temperature is below a first predetermined level;

second temperature sensing means for sensing the temperature of the fluid within the tank and providing a signal when said temperature is below a second predetermined level, said second predetermined level being higher than said first predetermined level;

relay means adapted to be electrically connected to the heating means of the tank and arranged to activate the heating means when energized;

first and second holding circuits for said relay means;

a remote control unit including a control panel located remotely of the tank;

a three-position switch means on the panel and connected in circuit with the relay means and the first and second temperature sensing means and arranged to provide selective operation of the heating means in any of three modes including:

(a) a first position wherein the relay means is continuously energized under the control of the first temperature sensing means for continuous operation of the heating means to provide heated fluid at said first temperature;

(b) a second position wherein the relay means is continuously energized under the control of the second temperature sensing means for continuous operation of the heating means to provide heated fluid at said second temperature; and (c) a third position permitting selective "one-time" operation of the heating means;

first and second control switches on said control panel, said first control switch being arranged to actuate the first holding circuit to thereby energize the relay means when the three-position switch is in its third position to activate the heating means, the first temperature sensing means being arranged in series with the first holding circuit to break the first holding circuit upon attainment of the first temperature level in the tank, and with said second control switch being arranged to actuate the second holding circuit to thereby energize the relay means when the three-position switch is in its third position to activate the heating means, the second temperature sensing means being arranged in series with the second holding circuit to break the second holding circuit upon attainment of the second temperature level in the tank; and signal means on the control panel to provide a remote indication of the fluid temperature in the tank and the condition of activation of the heating means.

2. The control system of claim 1 further including switch means for cancelling the signal to the relay means whenever said three-position switch means is in the third position.

3. The control system of claim 1 wherein said first and second temperature sensing means each comprises a thermostatic switch actuably responsive to the temperature of the fluid in the tank to provide said signal.

4. The control system of claim 1 wherein said heating means is an electric heating element.

5. The control system of claim 1 wherein the first and second control switches are momentary contact switches.

6. The control system of claim 1 wherein the signal means on the control panel comprises indicator light means.

7. The control system of claim 1 wherein said first predetermined temperature level is approximately 115° F. and said second predetermined temperature level is approximately 150° F.

* * * * *